United States Patent [19]

Takeshita et al.

[11] Patent Number: 4,623,018

[45] Date of Patent: Nov. 18, 1986

[54] THERMAL SYSTEM BASED ON THERMALLY COUPLED INTERMITTENT ABSORPTION HEAT PUMP CYCLES

[75] Inventors: Isao Takeshita, Neyagawa; Nobuyuki Yanagihara, Hirakata; Takaharu Gamo, Fujiidera; Yoshio Moriwaki, Hirakata, all of Japan

[73] Assignee: Matsushita Electric Industrial Co., Ltd., Kadoma, Japan

[21] Appl. No.: 629,072

[22] Filed: Jul. 9, 1984

[30] Foreign Application Priority Data

Jul. 8, 1983 [JP] Japan ................................ 58-125044
Apr. 5, 1984 [JP] Japan ................................ 59-68807
Apr. 24, 1984 [JP] Japan ................................ 59-82201
Apr. 24, 1984 [JP] Japan ................................ 59-82203
May 17, 1984 [JP] Japan ................................ 59-99043

[51] Int. Cl.[4] ........................ F25B 15/00; F28D 21/00

[52] U.S. Cl. ................................ 165/104.12; 62/112; 62/480

[58] Field of Search ..................... 165/104.12; 62/112, 62/467, 477, 480

[56] References Cited

U.S. PATENT DOCUMENTS 4,111,002 9/1978 Van Mal et al. .
4,523,635 6/1985 Nishizaki et al. ............. 165/104.12

FOREIGN PATENT DOCUMENTS 51295 4/1980 Japan ............................. 165/104.12
184891 11/1982 Japan ............................. 165/104.12

*Primary Examiner*—Albert W. Davis, Jr.
*Attorney, Agent, or Firm*—Wenderoth, Lind & Ponack

[57] ABSTRACT

A combined intermittently operated heat pump device which comprises n combinations (n being an integer equal to or greater than 2) of intermittently operated heat cycles, each combination comprising of vessels accommodating therein different kinds of absorbent material having different temperature and pressure characteristics and coupled with each other by means of a piping through which a common working medium can flow. The 2n batches of the absorbent materials in the respective vessels include at least n+1 kinds of the absorbent material having different temperature and equilibrium pressure characteristics, at least one temperature of heat of absorption in one of the cycles being selected to be higher than the temperature of heat of desorption in at least one of the remaining cycles. A heat transportation passage is provided between the one of the cycles and at least one of the remaining cycles for enabling the heat generated in the one of the cycles to be used as a heat input to the at least one of the remaining cycles.

2 Claims, 15 Drawing Figures

THERMAL SYSTEM BASED ON THERMALLY COUPLED INTERMITTENT ABSORPTION HEAT PUMP CYCLES

BACKGROUND OF THE INVENTION

The present invention relates to an improvement in and relating to a heating or cooling system based on thermally coupled intermittent absorption heat cycles, which utilizes the heat generation and absorption incident to a reversible absorption and desorption of a working medium to an absorbent material.

A majority of the energy consumed by the human being is consumed as heat energy and, at the same time, most of it is wasted. On the other hand, heat produced as a result of the combustion of chemical fuels is at an excessively high temperature for heating purpose. Accordingly, where heat of a relatively low temperature is demanded, it is desirable to increase the heat value by utilizing a high temperature heat source and absorbing heat from the atmospheric air. Conversely, it is often desired to raise the temperature of waste heats of low temperature or to realize a lower temperature than the temperature of a heat sink such as a room temperature by the utilization of a source of thermal energy.

Absorption heat cycles are known as an effective means for the utilization of thermal energies for these purposes. Of them, the absorption heat pump for heating and cooling is currently being watched with keen interest because of the structural simplicity and also of the minimized requirement for auxiliary power. As a working medium used in the absorption heat pump, it can be contemplated to use such materials as a hydrogenated metal, an inorganic hydrate, an organic substance and zeolite. Working gaseous mediums include hydrogen, water vapour and ammonium.

The intermittently driven heat pump devices hitherto well known, while considered to have numerous advantages such as energy-saving, low-noise and low-vibration features, have not yet answered the purpose of practical utility as much as the compression type and the absorption type. The reason therefor is that performances of these heat pump devices including the coefficient of performance (COP) are relatively low and the conditions in which they are utilized are limited, and they also have a high manufacturing cost. Furthermore, it is difficult to solve the problem from the technical viewpoint. Accordingly, an important problem with the intermittently driven heat pump devices is to increase the performance and to reduce the price thereof. In addition, it is often desired to lower the temperature attained in a cooling cycle for creating a lower temperature than that of a heat sink, and to raise the temperature attained in a temperature-upgrading heat pump designed to obtain a higher temperature than that of a heat source.

Hereinafter, the structure of the prior art heat pump device and the problem inherent therein will be described by way of an example wherein a hydrogenated metal is used.

The temperature versus pressure relationship exhibited by the usual prior art intermittent heat pump cycle is shown in FIG. 1.

While two kinds of hydrogenated metals capable of exhibiting different temperature versus equilibrium pressure characteristics are used, the temperature of one of the hydrogenated metals exhibiting a lower equilibrium pressure for a given identical temperature, which compound is hereinafter referred to as MH1, is raised to a temperature TH by inputing heat from a high temperature heat source. This condition is shown as Phase A. In this case, MH1 increases in pressure with increase of the temperature and hydrogen of MH1 can move, by the effect of the difference in pressure, to the other hydrogenated metal (referred to as MH2) exhibiting a higher equilibrium pressure and, therefore, the temperature attained by MH2 is TM, this condition being shown as a Phase B. When MH1 maintained at the temperature TM is subsequently communicated with MH2, the hydrogen of MH2 moves to MH1. As a result of this movement, the temperature of MH2 decreases to a value TL below the ambient temperature by the effect of endothermic reaction (Phase C) while MH1 is heated (Phase D). By repeating the process consisting of the sequence of Phases A to D, it is possible to realize a heat pump cycle wherein heat of the temperature TM can be produced by the reaction taking place at Phases B and D while heat from the high temperature heat source of the temperature TH is inputed at Phase A, and a heat pump cycle for refrigeration wherein the cooling effect of the temperature TL can be produced by the endothermic reaction taking place at Phase C.

In the heat pump cycle shown in FIG. 1, although it is watched with keen interest as an energy saving device because the coefficient of performance (COP) is greater than 1.0 and the thermal output is greater than the thermal input, the COP for cooling is about 0.4 to 0.5 and, therefore, the performance thereof is not favorable relatively.

In this heat pump cycle now under discussion, when the temperature TH of the input heat source is selected to be of a high quality, relatively high temperature, for example, 200° to 300° C., the COP decreases rather than increasing and, therefore, the high quality, high temperature heat source can not be effectively and efficiently utilized.

Hereinafter, the prior art heat pump cycle for heat upgrading purpose will be described by way of an example wherein hydrogenated metals are employed.

The usual prior art heat pump cycle for heat upgrading purpose exhibits a temperature versus equilibrium pressure relationship as shown in FIG. 2. Two kinds of the hydrogenated metals capable of exhibiting different temperature versus equilibrium pressure characteristics are utilized, and when the hydrogenated metal MH1 of lower equilibrium pressure, which has sufficiently absorbed hydrogen is heated to a temperature TM (Phase E), is communicated with the dehydrogenated metal MH2 of higher equilibrium pressure at the identical temperature which has sufficiently desorbed hydrogen of a temperature TL, the hydrogen absorbed by MH1 moves to MH2 (Phase F). At this time, although MH2 produces heat by the effect of the exothermic reaction, the heat so produced is discharged to the atmosphere.

When MH2 is heated to the temperature TM and is then communicated with MH1 having desorbed the hydrogen, the hydrogen moves from MH2 to MH1. At this time, MH1 is heated by the exothermic reaction with its temperature increasing from the value TM to a value TH and produces heat (Phase H) at an equilibrium temperature for a pressure corresponding to the equilibrium pressure attained by MH2 at the temperature TM. By repeating the process consisting of the sequence of Phases E to H, it is possible to produce heat of a higher temperature TH than the temperature TM of the input heat source.

Although the heat pump cycle for heat upgrading purpose has a relatively high utility in that heat of a higher temperature than that of the input heat source can be produced, demands have been made to further maximize the temperature attained by the heat pump cycle. However, given the temperature of the input heat source and the temperature of heat discharged on the low-temperature side, the range over which the temperature can be increased is automatically fixed. Similarly, even in the case of the heat pump cycle for cooling purpose, demands have been made to minimize the temperature attained by the heat pump cycle. To meet these demands, it is necessary to increase the heating temperature to suit to the situation resulting in the problem that the high pressure side tends to be highly pressurized.

An idea of a multi-stage cycle has been introduced in an attempt to meet the above described demands.

FIG. 3 illustrates the temperature versus equilibrium pressure exhibited by the double-effect intermittent cycle in which the high temperature heat source can be effectively utilized. In the graph of FIG. 3, A, B, C and D correspond respectively to A, B, C and D shown in FIG. 1. TH represents the heating temperature of the first stage cycle. If another cycle performing the process consisting of the sequence of A′, B′, C and D using the same absorbent material is formed with the temperature at B′ being somewhat higher than the temperature at A and if the heat produced at B′ is transported to A by the use of any heat transporting means to make it available for heating MH1 of the cycle of A, B, C and D, this cycle will be driven by waste heat produced by the cycle of A′, B′, C and D and, as a consequence, for the heat input at A′ of the cycle of A′, B′, C and D, the low temperature heat output at C can be obtained from the two cycles and, therefore, the output increases as compared with that of a single-stage cycle with the result of an increased COP. Similarly, when it is considered as a heat pump cycle, since heat generation takes place at B and D of the cycle of A, B, C and D and also at D of the cycle of A′, B′, C and D, the output can increase and the coefficient of performance can also increase. In such case, the heating temperature increases from the value TH to a value TH′ and, although it is a method applicable where the high heating temperature can be available, it may be said that the method effectively utilizes the high temperature of the heat source. In FIG. 3, the bold arrow-headed line represents the transportation of the heat and, for the purpose of simplification of the drawing, points A and B′ are shown as having the identical temperature TH.

FIG. 4 illustrates the example wherein the cycles are two-staged for producing a lower temperature, wherein A, B, C and D correspond exactly to A, B, C and D of FIG. 1, respectively. In this connection, if another cycle of A, B, C′ and D′ is formed by the use of the same absorbent materials MH1 and MH2 so that the temperature at D′ can be somewhat higher than that at C, and the heat generated at D′ is removed by absorption at C of the cycle of A, B, C and D (the bold arrow-headed line representing the transportation of the heat), heat absorbent of a temperature TL′ can be produced at C′ of the cycle of A, B, C′ and D′ and, thus, the temperature TL′ lower than the temperature TL can be obtained, it being noted that the temperature difference of TM−TL′ is approximately twice the temperature difference of TM−TL.

FIG. 5 illustrates the example of the heat upgrading model, wherein E, F, G and H correspond respectively to E, F, G and H of FIG. 2. In this connection, if another cycle of E, F, G′ and H′ is formed by the use of the same absorbent materials MH1 and MH2 so that the point G′ can be heated at a temperature slightly lower than the temperature TH of heat produced at H, the cycle of E, F, G′ and H′ can be driven by the heat produced at H of the cycle E, F, G and H with the result that heat of a temperature TH′ is produced at H′. Thus, the temperature TH′ higher than the temperature TH can be obtained, the temperature difference of TH′−TM being approximately twice that of TH−TM.

These methods are advantageous in that the high performance, the great coefficient of performance and the low or high temperature, which have not been achieved by the single-stage cycle, can be obtained. However, they have a disadvantage in that, as compared with the basic cycle of A, B, C and D (E, F, G and H), the difference between high and low pressures tends to increase in the cycle of A′, B′, C and D (E, F, G′ and H′). Considering that the ordinates represents the logarithm of the pressure, the increase of the pressure difference reaches a considerably great value. Specifically, if the low pressure side is assumed to be about 2 atms. because a lower pressure head can not be selected in view of the pressure loss occurring during the flow of gas, the high pressure side in the usual cycle is about 8 atms. whereas the high pressure side in the cycle of A′, B′, C and D is higher than 25 atms., although it depends on the temperature range applied to the absorbent material. This poses a problem of safety and, in order to secure the safety, it is necessary to increase the pressure resistance of vessels for accommodating the absorbent materials by giving them a great wall thickness.

The coefficient of performance of the intermittent heat cycle is expressed by a ratio between the output, which is the balance between the heat of absorption or desorption by the absorbent material and the loss of sensible heat attributable to the heat capacity of both the absorbent material and the absorbent vessel, and the input which is the sum of said heat of absorption or desorption plus the loss of said sensible heat. Therefore, the higher the pressure resistance of the absorbent vessel, the higher the heat capacity thereof, resulting in a decreased coefficient of performance. Moreover, increase of the pressure range is invited by the increase of the temperature range applied to the absorbent material and, therefore, lowers the loss of sensible heat. Accordingly, unless care is taken, the output will become zero.

Furthermore, where the two-stage model is developed with a view to increasing the coefficient of performance of the first mentioned cooling cycle, the coefficient of performance COP2C thereof will be expressed by the following equation:

$$COP2C = COP1C1(1 + COP1C2) \quad (1)$$

wherein COP1C1 and COP1C2 represent the coefficient of performance of the cycle of A′, B′, C and D and that of A, B, C and D, respectively.

Accordingly, in the event that the coefficient of performance COP1C1 of the high pressure cycle becomes zero, the coefficient of performance COP2C becomes zero correspondingly.

The coefficient of performance COP2H exhibited when the cycle is used to produce heat is given by the sum of one and COP2C, namely:

$$COP2H = COP2C + 1 \quad (2)$$

The composite coefficient of performance COP2D of the two-stage model developed for the purpose of giving a lower temperature is expressed by the following equation:

$$COP2D = (COP1D1 \times COP1D2)/(1 + COP1D2) \quad (3)$$

wherein COP1D1 and COP1D2 represent the coefficient of performance of the cycle of A, B, C and D and that of the cycle A, B, C' and D', respectively.

The coefficient of performance COP2T of the two-stage model of the heat upgrading cycle developed to give a higher temperature is expressed by the following equation:

$$COP2T = (COP1T1 \times COP1T2)/(1 + COP1T1 \times COP1T2 - COP1T2) \quad (4)$$

wherein COP1T1 and COP1T2 represent the coefficient of performance of the cycle of H, G, E and F and that of H', G', E and F, respectively.

Since both of COP1D1 and COP1D2 are of a value smaller than 1, COP2D takes an extremely small value. In addition, since both of COP1T1 and COP1T2 is of a value smaller than 0.5, COP2T takes an extremely small value.

As hereinbefore discussed, although the two-stage arrangement using the two single-stage intermittent heat cycles makes it possible to increase the coefficient of performance, and also to produce heat of high or low temperature, it is susceptible to an increase in pressure difference with the coefficient of performance reduced consequently. Moreover, even a multi-stage arrangement constructed by combining three or more cycles is equally susceptible to the increase in pressure difference and, accordingly, it necessarily results in the reduction in coefficient of performance.

SUMMARY OF THE INVENTION

The present invention has for its essential object to provide a thermal system wherein two intermittently driven heat pump cycles each comprising a working gas and two kinds of absorbent materials having different equilibrium temperature versus pressure characteristics and operable to reversibly absorb and desorb the working gas are combined together so that heat evolved during the absorption in one of the cycles can be absorbed by heat absorption during the desorption in the other of the cycles to produce a multiple effect for increasing the coefficient of performance and for effecting a multi-stage cooling to lower the temperature or, when applied in a heat pump cycle for heat upgrading, to increase the temperature.

When the above described object is desired to be accomplished by the system wherein the two conventional cycles are thermally coupled with each other, since the same absorbent material is employed for a combination of absorbent materials used in the two cycles, when they are multi-staged, the range of the working pressure tends to increase and, therefore, caused the necessity of increasing the pressure resistance in the vessels, which in turn constitutes a cause of the lowering of the coefficient of performance.

According to the present invention, however, in the case where the cycle is combined in n-stages, n combinations of two materials selected from at least n+1 kinds of absorbent materials are prepared and, by using this combination, the n-stage arrangement is provided. If in each pair the material of low equilibrium pressure at a given temperature and that of high equilibrium pressure at the same given temperature are called "high temperature material" and "low temperature material", respectively, in the case of the multi-stage fabrication, there is the feature that a heat transportation means is provided between the high temperature materials of different temperature versus equilibrium pressure characteristics or between the low temperature materials of different temperature versus equilibrium pressure, to it possible to combine them in a multi-staged arrangement.

More specifically, by utilizing heat evolved upon the absorption of the working medium in the high temperature material in a first combination to effect the heating for the purpose of desorbing the working medium from the high temperature material in a second combination so that the second combination can be driven, the efficiency of the heat pump cycle can be increased and, by treating heat, evolved when the low temperature material in the first combination absorbs the working medium, through the heat absorption which takes place when the low temperature material of a second cycle discharges the working medium, a further low temperature can be created, or by the combination of the both, the low temperature can be effectively and efficiently created.

In addition, even in the case of the heat pump for heat upgrading purpose, by utilizing the heat, generated when the high temperature material in the first combination absorbs the working medium, to effect the heating for desorbing the working medium from the high temperature material in the second combination, a further high temperature can be created.

The multi-stage fabrication according to the present invention is characterized in that, by suitably selecting the absorbent materials, the multi-stage fabrication can be achieved without substantially causing the high and low limits of the working pressure of the working medium to depart from that in the single-stage cycle. With the prior art system, since the multi-stage fabrication results in the pressure range increased to a value represented by the power of the number of the stages, the increased pressure resistance of the vessels is necessitated, resulting in the increase of the heat capacity of the vessels and also in the increase of the temperature range whereby the increased loss of sensible heat is accompanied by a reduced coefficient of performance. The present invention is free from such problems, and experiments have shown that the coefficient of performance attained by the multistage arrangement is greater than that by the prior art system.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
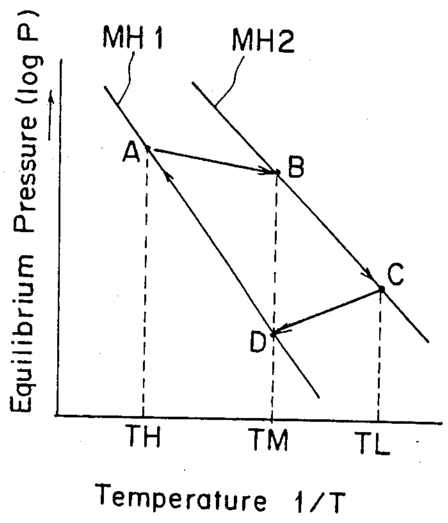
FIG. 1 is a graph showing the theoretical intermittent-absorption heat pump cycle for heating and cooling.
Figure 2:
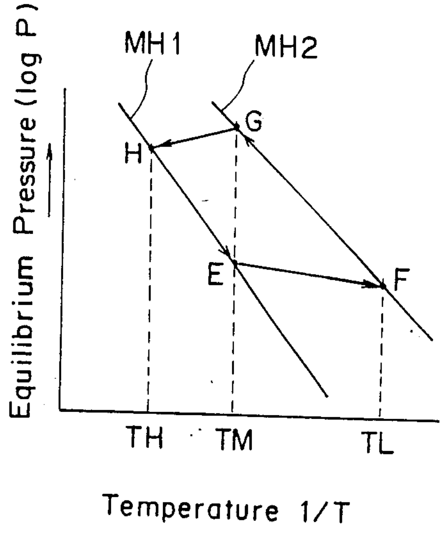
FIG. 2 is a graph similar to FIG. 1, showing the theoretical intermittent absorption heat pump for heat upgrading.
Figure 3:
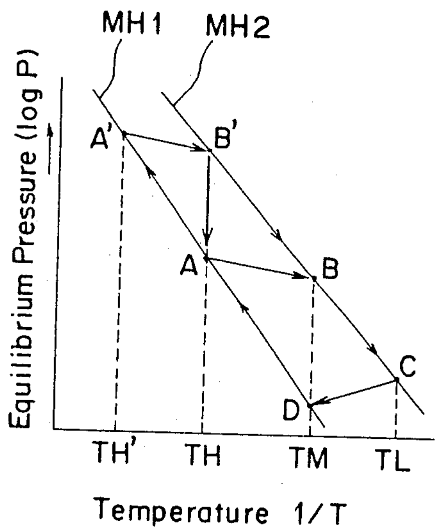
FIG. 3 is a graph similar to FIG. 1, showing a conventional double-effect intermittent absorption heat pump cycle.
Figure 4:
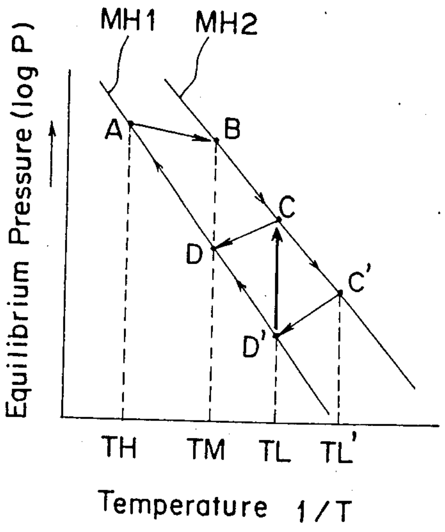
FIG. 4 is a graph similar to FIG. 1, showing a conventional two-stage intermittent absorption cooling cycle.
Figure 5:
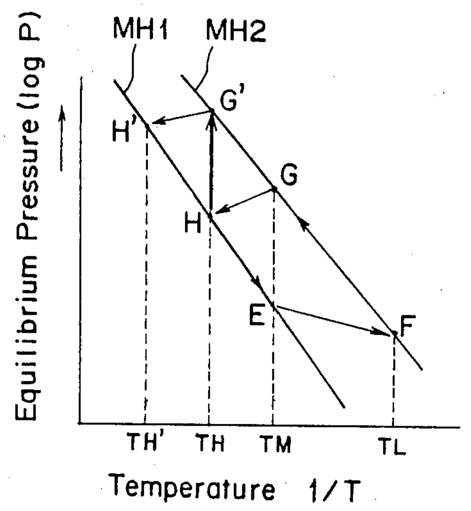
FIG. 5 is a graph similar to FIG. 1, showing a conventional two-stage intermittent absorption heat pump cycle for heat upgrading.
Figure 7:
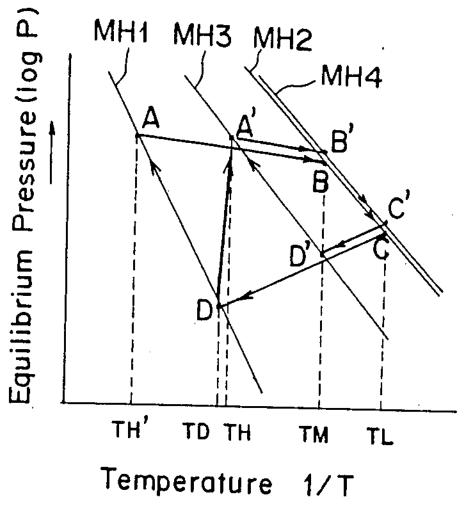
FIG. 7 is a graph showing the cycle of the device of FIG. 6.
Figure 6:
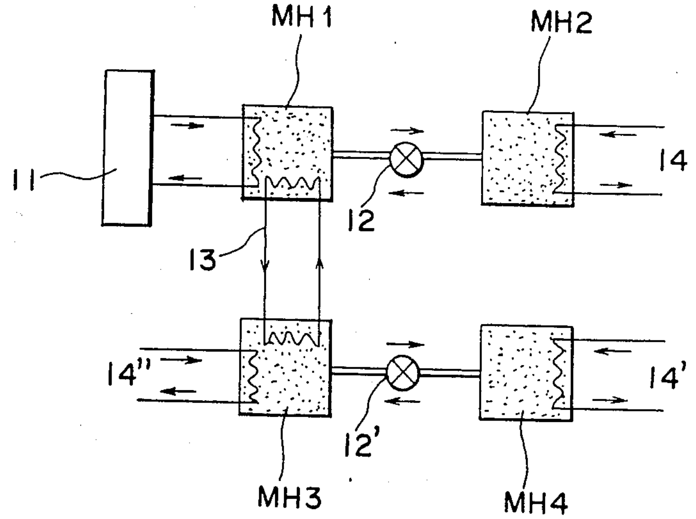
FIG. 6 is a schematic diagram showing a double-effect intermittent heat pump device according to one embodiment of the present invention.

Referring to FIGS. 6 and 7, the description will be made in connection with the example wherein hydrogenated metals are used as a medium capable of absorbing and desorbing hydrogen. As shown in FIG. 6, two sets of closed vessels were prepared, each of said sets comprising two separated closed vessels and the closed vessels of the two sets being filled with respective kinds of metallic hydrogenated materials of different temperature and equilibrium pressure characteristics. MH1 and MH2 shown in FIG. 6 form a first heat pump cycle operable relatively on a high temperature side whereas MH3 and MH4 form a second heat pump cycle operable relatively on a low temperature side. In these two heat pump cycles, the high temperature heating side wherein the equilibrium pressure at a given temperature is low is constituted by both MH1 and MH3.

The heat pump device of the above described structure operates in the following manner.

The hydrogenated metal (MH1) on the high temperature heating side of the first heat pump cycle is heated by a source 11 of waste heat of relatively high temperature. When MH1 is so heated, the temperature raises to a point A shown in FIG. 7. The subsequent opening of a hydrogen gas valve 12 at the time when the temperature attains the point A results in the movement of hydrogen towards MH2 by the effect of the difference in pressure between MH1 and MH2, and heat is consequently generated in MH2 as a result of reaction. (The movement of the hydrogen towards MH2 is shown by the arrow-headed line extending from the point A to a point B in FIG. 7.) When the heating of MH1 from the waste heat source 11 is subsequently interrupted, the temperature MH1 gradually decreases accompanied by the decrease of the equilibrium pressure below that of MH2 and, therefore, the movement of the hydrogen from MH2 towards MH1 by the effect of the pressure difference takes placed. (This condition is shown by the arrow-headed line extending from the point B to a point C and also by the arrow-headed line extending from the point C to a point D in FIG. 7.) At this time, MH2 produces a cooling effect as a result of discharge of the hydrogen whereas MH1 produces a heating effect as a result of absorption of the hydrogen.

So far as the operation of the device in which only MH1 and MH2 are utilized is concerned, it is no different than the usual conventional heat pump device. However, in the present invention, an essential feature resides neither in the utilization of the heating effect, produced in MH1, merely as a heat output (for example, during the heating of space) nor in the discharge of heat (for example, during the cooling of space), but in the utilization of the heating effect, produced in MH1, as a heating source for MH3 of the separately constructed second heat pump cycle.

By so designing, the second heat pump can operate, undergoing one cycle.

Comparing the heat pump device shown in FIGS. 6 and 7 with the prior art double-effect heat pump cycle, the two heat pump cycles in the prior art is a combination of the same absorbent material MH1 and MH2 and the heat produced by MH2 of the first cycle is used as a heat source for heating MH1 of the second cycle. In order to enable the utilization of the heat produced by MH1, in the second cycle such as in the present invention, the absorbent material on the high temperature side of the second cycle must have a temperature vs. pressure characteristics different from that in MH1. In addition, the temperature of heat produced in MH1 (shown by TD in FIG. 7) must be higher than the heating temperature TH at which MH3 is heated.

In view of the foregoing, a heat medium circulating circuit 13 was provided between MH1 and MH3 so that, by supplying the heat, produced in MH1 at the point D in FIG. 7, to MH3 of the second heat pump cycle, the reaction of A'→B' in FIG. 7 could be accomplished. The bold arrow-headed line in FIG. 7 represents the transportation of the heat.

With this design, the second heat pump cycle is effective to move the hydrogen in the sequence of A'→B'→C'→D' in a manner similar to that in the first heat pump cycle.

The heat pump device according to the present invention is such that, by heating MH1 to raise the pressure and also inputing the heat necessary for the reaction to MH2 (Point A in FIG. 7), a heated medium at the points B, B' and D' and a cooled medium at the points C and C' can be utilized one at a time during the space heating and during the space cooling, respectively. This output can be drawn from output ends 14, 14' and 14" provided in MH2, MH4 and MH3, respectively.

The inventors of the present invention have constructed and tested the heat pump device of the structure shown in FIG. 6 and having such a temperature versus pressure cycle as shown in FIG. 7, the details of which will now be described.

10 kg of $Ti_{0.3}Zr_{0.7}Mn_{1.2}Cr_{0.6}Co_{0.2}$, 10 kg of $Ti_{0.6}Zr_{0.4}Mn_{1.2}Cr_{0.6}Cu_{0.2}$, and 10 kg of $Ti_{0.9}Zr_{0.1}Mn_{1.4}Cr_{0.4}V_{0.2}$ were used for MH1, MH3 and each of MH2 and MH4, respectively, and were filled in the device of the structure shown in FIG. 6. These Ti-Mn alloys were adjusted to form hydrogenated metal alloys so that about 63 moles of hydrogen gas could move in each of the first and second heat pump cycles during each cycle.

By heating MH1 to about 200° C., the performance as a heat pump device was examined. As a result, the COP value was as favorably high as 1.8 (during the heating) and 0.91 (during the cooling), and the repeated operation took place smoothly. At that time, the low pressure was higher than 1.2 kg/cm$^2$ whereas the high pressure was lower than 12 kg/cm$^2$. It is to be noted that the use of the same materials or materials having substantially identical temperature and equilibrium pressure characteristics is preferred as a reaction medium on the side of heat absorption having a high equilibrium pressure at a given temperature in each of the heat pump cycles. This is because, by substantially equalizing the levels of temperature of the heat produced upon the reaction or the heat absorbed, not only can the temperature level at the utilizing side be maintained at a constant value, but also the high and low pressures can be maintained substantially at constant values in these cycles. Moreover, although the following description is equally applicable to the other embodiments of the present invention, it is advisable that, in at least one of the heat pump cycles, a hydrogen gas is used as a working gas while a metal, or its alloy, capable of forming a hydrogenated metal is used as the absorbing and desorbing reaction medium. The heat pump cycles wherein the hydrogenated metal is used are excellent in reversibility of the reaction and also have good durability to withstand repeated operation and have the merit that the reaction speed is very high. Furthermore, most of the materials for the heat pump device according to the present invention are capable of reacting at a relatively high temperature, and the present invention is not always limited to the use of the two heat pump cycles (double-effect model), but is also applicable to the use of three or more heat pump cycles (multi-effect models), using a high temperature heat source to make the best use of the waste heat. The medium filled vessels may be either the same materials or different materials where it is a hydrogenated metal.

Where the intermittently operated heat pumps are fabricated into the double-effect model according to the method of the present invention, the pressure range between the high and low pressures can be equal for each stage. Therefore, the problem hitherto encountered of the increase in high pressure resulting from the multi-stage fabrication can be eliminated and, accordingly, the pressure resistance of the vessels need not be increased. This in turn brings about the avoidance of the reduction in coefficient of performance which often results from the increased heat capacity of the vessels.

The COP of this type of the double-effect heat pump cycle can be theoretically calculated from the following equation:

$$COP2C = COP1C1 + COP1C2 \quad (5)$$

The symbols used in the equation (5) above correspond to those used in the equation (1), but it will readily be seen that, considering that each of COP1C1 and COP1C2 is smaller than 0, the COP2C in the equation (5) takes a value greater than COP2C in the equation (1). Thus, the fabrication into the double effect model according to the present invention brings about advantages over that according to the prior art because, even if the COP of each stage is assumed to be the same as in the prior art, the COP resulting from the combination of the stages is greater in the present invention than according to the prior art. Considering that, according to the prior art, the COP1C1 is considerably reduced because of the increased loss of sensible heat resulting from both the increased heat capacity of the vessels and the increased temperature range, the present invention has shown a great improvement.

It is to be noted that, as is the case with the prior art, the coefficient of performance COP2H of the heat pump in which the heat output can be obtained from the points B, B' and D' can be calculated by adding 1 thereto and has a greater value than the case with the prior art as COP2C has a greater value as hereinbefore described.

Hereinafter, another embodiment of the present invention wherein two cooling cycles are fabricated into a two-stage model to produce a lower temperature than that produced by the single stage will be described with reference to FIGS. 8 and 9. Even in this embodiment of FIGS. 8 and 9, the description will proceed with the hydrogenated metals used as the absorbing and desorbing medium. As is the case with the foregoing embodiment, a first cooling cycle operable under standard temperature conditions TH, TM and TL is constituted by MH1 and MH2, the operation of which is similar to that hereinbefore described. A second cooling cycle is constituted by MH3 and MH4 and is heated by the heat source 11 the same as the first cycle, the temperature TH on the high temperature side being the same as that of the first cycle.

When a valve 12' is opened, the hydrogen gas is moved towards and absorbed in MH4, producing heat. The heat absorbing reaction in MH2 of the first cycle is made to occur at the timing of generation of heat from MH4 and, if a heat transportation means 13 is provided between MH2 and MH4, MH4 can be cooled by the temperature Tc of a cooled output of MH2. When the valve 12' is subsequently closed to allow MH2 to be cooled by a radiator 16 to a temperature equal to that of the atmosphere, the hydrogen in the second cycle moves from MH4 towards MH3 with the consequence that MH4 is cooled to a temperature Tc' lower than the temperature Tc. This can be drawn from an output end 17.

Figure 8:
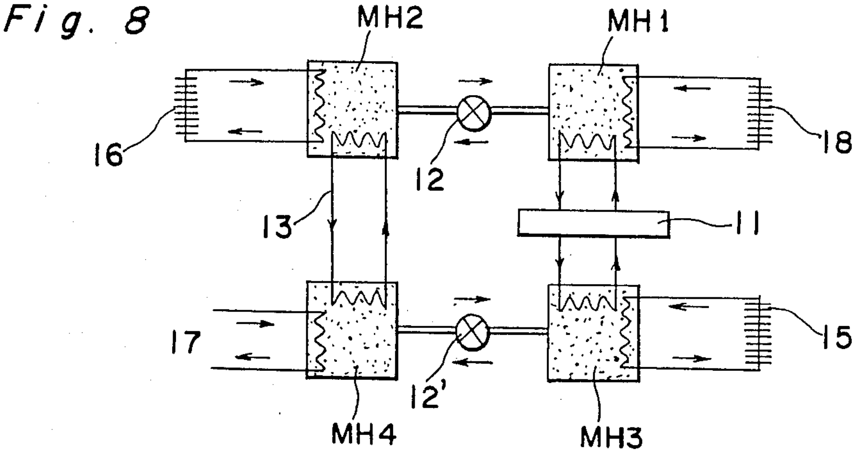
FIG. 8 is a schematic diagram showing a two-stage intermittent cooling device according to another embodiment of the present invention.
Figure 9:
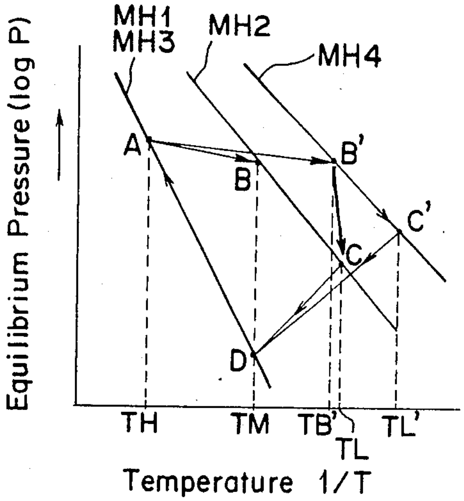
FIG. 9 is a graph showing the cycle of the device of FIG. 8.

The embodiment of FIGS. 8 and 9 is different from the prior art two-stage cooling cycle in that, while the two cooling cycles in the prior art is a combination of the same absorbent material MH1 and MH2 and, by the utilization of the cooling effect produced by MH2 of the first cycle, the heat produced by MH1 of the second cycle as a result of the absorption of hydrogen gas is cooled, the present invention makes use of a combination of MH3 and MH4 for the second cycle and the heat generated when MH4 absorbs the hydrogen is cooled by the cooling effect of the first cycle.

In order for the heat generated in MH4 to be cooled by the cooling effect of the first cycle such as achieved in the present invention, the temperature TB' of the heat generated in MH4 of the second cycle is required to be somewhat higher than the output temperature TL of the first cycle and, at the same time, the timing of the heat absorption and that of the heat generation must be matched, and the heat transportation means operable only when the necessity arises is also required. In addition, by the employment of the same materials in MH1 and MH3, the high and low pressures of these two cycles can be substantially equalized, or it is preferred to design the system so that the high and low pressures can fall within an readily available range. It is to be noted that the bold arrow-headed line in FIG. 9 represents the movement of the heat.

The inventors of the present invention have constructed and tested the cooling device having the structure shown in FIGS. 8 and 9 and such a temperature and pressure cycle as shown in FIG. 9, the results of which will now be described.

5 Kg of $Ti_{0.35}Zr_{0.65}Mn_{1.2}Cr_{0.6}Co_{0.2}$ for each of MH1 and MH3, 5 Kg of $Ti_{0.6}Zr_{0.4}Mn_{1.4}Cr_{0.4}Cu_{0.2}$ for MH2 and 5 Kg of $Ti_{0.8}Zr_{0.2}Mn_{1.2}Cr_{0.6}Cu_{0.2}$ for MH4 were employed and filled in the device of the structure of FIG. 9. They were adjusted to form hydrogenated metals so that about 31 moles of hydrogen gas can move in each of the heat pump cycles. When the temperature of the heat source 11 was adjusted to 95° C. and the temperature of the heat discharged by the first cooling cycle to the heat sink was adjusted to 45° C., a low temperature of about 20° C. could be obtained.

On the other hand, when the second cooling cycle was equally heated at 95° C., and the heat generated upon the absorption by the absorbing and desorbing medium on the low temperature side was cooled by the cooled output of 20° C. of the first cycle while the heat generated upon the absorption by the absorbing and desorbing medium on the high temperature side was discharged at 45° C. as was the case with the first cycle, a low temperature of about 2° C. could be obtained.

While the foregoing experiment was conducted to obtain a low temperature under unfavourable conditions in which the temperature of the heat source is low and that of the heat sink is relatively high such as in air conditioning, if the temperature of the heat source is higher than that, a lower temperature than that in the first cycle could be obtained and, if the material for MH4 of the second cycle is selected so as to be suitable therefor, a lower temperature than that could be obtained.

In the foregoing experiment, the coefficient of performance which is the output divided by the input was 0.3.

Figure 10:
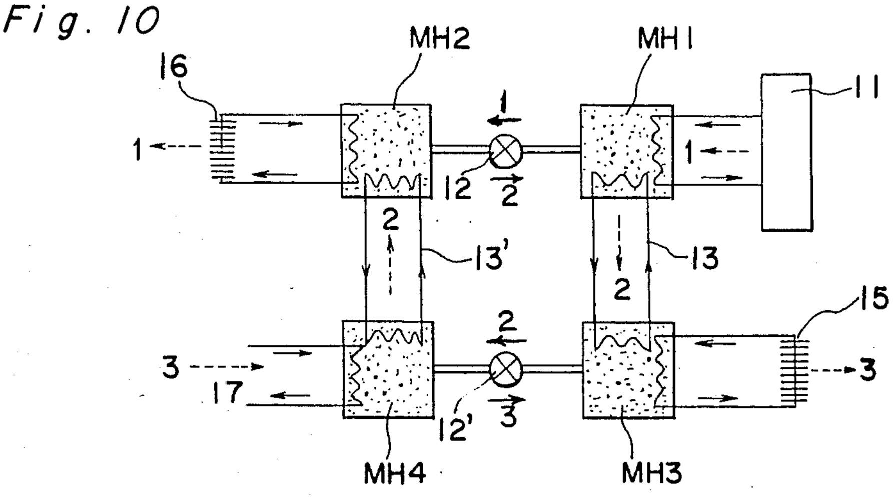
FIG. 10 is a schematic diagram showing a double-effect, two-stage intermittent cooling device according to a further embodiment of the present invention.

Although the cooling cycle shown in FIGS. 9 and 10 is a two-stage model, it may be fabricated into a three-stage or four-stage model by the utilization of the same principle and, even in that case, without increasing the heating temperature, a remarkably reduced low temperature can be attained.

As previously described, where the low temperature is desired to be obtained by the use of the intermittent cooling cycle, it is necessary to increase the heating temperature in order to obtain a further reduced low temperature and since a high temperature can not be provided for the heat source where the solar heat is used, temperature attained is limited and, therefore, the utility is limited.

On the contrary thereto, although a method of combining the two cycles has been previously invented, the major problem resides, as has been described in connection with the double-effect cycle, in that the difference between the high and low pressures increases.

According to the method of the present invention, if the loss of pressure necessary for the movement of the gas between the two absorbing and desorbing media is disregarded, the increase of the number of the stages would not alter the high and low pressures.

In addition, with respect to the coefficient of performance, if the coefficients of performance of the respective cycles are expressed by COP1D1 and COP1D2 as is the case in the equation (3), the coefficient of performance COP2D of the two-stage cooling cycle according to the present invention can be given by the following equation:

$$COP2D=(COP1D1\times COP1D2)/(COP1D1+COP1D2) \quad (6)$$

Considering that COP1D1 is smaller than 1, it is evident that the system of the present invention can exhibit a better coefficient of performance than that of the prior art.

According to the prior art method, since the absorbent material in the cycle of the second stage is heated and cooled over a wider range than that in the present invention, it has a disadvantage in that the loss of sensible heat attributable to the heat capacity of the vessels and the absorbent material is great.

This problem is eliminated in the present invention and one can expect that COP1D2 can have a value comparable to COP1D1.

As hereinbefore described, the system of the present invention has such numerous advantages as hereinbefore described. However, the coefficient of performance will essentially become small with an increase of the number of the stages.

In view of this, where the temperature of the heat source can be increased, a method can be contemplated to combine the multi-effect model with the multi-stage cooling, an example of which will now be described with particular reference to FIGS. 10 and 11.

Figure 11:
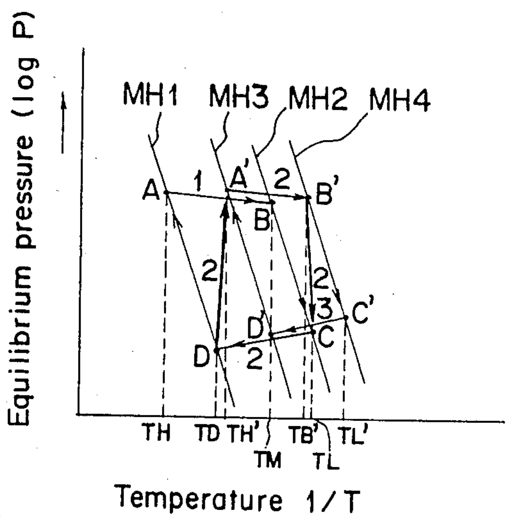
FIG. 11 is a graph showing the cycle of the device of FIG. 10.

Referring to FIGS. 10 and 11, the description will be made in connection with the example wherein hydrogenated metals are used as a medium capable of absorbing and desorbing hydrogen. As shown in FIG. 10, two sets of closed vessels were prepared, each of said sets comprises two separated closed vessels and the closed vessels of the two sets being filled with respective kinds of hydrogenated metals of different temperature and equilibrium pressure characteristics. MH1 and MH2 shown in FIG. 10 form a first cooling cycle operable on a relatively high temperature side whereas MH3 and MH4 form a second cooling cycle operable on a relatively low temperature side. In these two heat pump cycles, the high temperature heating side wherein the equilibrium pressure at a given temperature is low is constituted by MH1 and MH3.

The cooling device of the structure described above operates in the following manner.

First Step

The hydrogenated metal on the high temperature heating side of the first cooling cycle is heated by the heat source 11 to a temperature TH and the hydrogenated metal MH2 on the low temperature heat generating side is cooled by the atmosphere air of a temperature TM with the aid of the radiator 16. When the valve 12 is subsequently opened, the hydrogen absorbed in MH1 moves towards MH2. In FIG. 10, the arrow-headed solid lines indicate the movement of the hydrogen while the arrow-headed broken lines indicate the transportation of heat, and reference numbers 1, 2 and 3 affixed to the arrow-headed solid and broken lines represent the first, second and third steps, respectively.

During this step, heat is imparted to MH1 from the heat source 11 and, therefore, MH2 generates heat. The heat generated by MH2 in turn vanishes as it is discharged by the radiator 16.

Second Step

When the valve 12 is closed at the time of termination of the first step, it allows heat to be transported from MH1 towards MH3 through the transportation means 13, and when the valve 12 is subsequently opened again, the hydrogen moves from MH2 towards MH1 and generates heat in MH1, which heat is used to heat MH3. As a result of the heating of MH3, the hydrogen is generated and is, when the valve 12' is opened, absorbed in MH4 to generate heat. When this heat is subsequently transported to MH2 through a heat transportation means 13', MH2 further generates the hydrogen with the result of the further generation of heat from MH1 which in turn heats MH3. In this way, the reaction proceeds and as a result, the hydrogen moves from MH2 towards MH1 and from MH3 towards MH4. When the reaction terminates at this point, the valves 12 and 12' are closed.

Third Step

When MH3 is cooled through a radiator 15 and the valve 12' is subsequently opened, the hydrogen moves from MH4 towards MH3. When this happens, heat absorption and heat generation take place in MH4 and MH3, respectively, and the continued discharge of heat, generated upon the hydrogen desorption in MH3, through the radiator 15 results in the cooled output from the output end 17.

Referring to the cycle chart of FIG. 11, the temperatures at which MH1 is heated and cooled and the temperatures at which MH3 is heated and cooled are TH, TD, TH' and TM, respectively, and since TH' is selected to be lower than TD, it is possible to transport the heat from MH1 to MH3. (as shown by the bold arrow-headed line). In addition, the temperature of the heat discharged from MH2, and the temperature of the heat absorbed are TM and TL, respectively, and since the temperature TB' of the heat discharged from MH4, although it is a temperature of the cooling output of the first stage, is selected to be higher than TL, it is possible to transport the heat from MH4 to MH2 as shown by the bold arrow-headed line. As a result, MH4 absorbs heat at TL'. Since TL' is lower than TL, a temperature lower than that attained by the first stage cycle can be obtained. (It is to be noted that the numerical characters 1, 2 and 3 employed in FIG. 11 represent the first, second and third steps, respectively.)

The inventors of the present invention have constructed and tested the cooling device of the structure shown in FIG. 10 and having temperature and pressure cycles shown in FIG. 11, the result of which will now be described.

5 Kg of $Ti_{0.33}Zr_{0.67}Mn_{1.4}Cr_{0.4}Cu_{0.2}$ for MH1, 5 Kg of $Ti_{0.8}Zr_{0.2}Mn_{1.2}Cr_{0.6}Cu_{0.2}$ for MH2, 5 Kg of $Ti_{0.45}Zr_{0.55}Mn_{1.2}Cr_{0.6}Cu_{0.2}$ for MH3, and 5 Kg of $Ti_{0.8}Zr_{0.2}Mn_{0.8}Cr_{1.0}Fe_{0.2}$ were filled in the device of the structure shown in FIG. 10. They were adjusted to form hydrogenated metals so that about 31 moles of hydrogen can move in each of the heat pump cycles.

When the temperature of the heat source and the temperature of the heat discharged to the atmosphere were set to be 170° C. and 45° C., respectively, the temperature of waste heat of the first cycle and that of the cooling output were 100° C. and 13° C., respectively, and the temperature of the heat discharged to the atmosphere in the second cycle which was driven by the waste heat of the first cycle and that of the cooled output of such second cycle were consequently 45° C. and −15° C., respectively.

The high pressure in each of the two cycles was lower than 10 atms. while the low pressure in each of these cycles was higher than 1 atm.

The coefficient of performance of the double-effect, two-stage cooling cycle was 0.6 and substantially the same as that of the first stage cycle.

Although the description of the principle of operation made hereinabove has been divided into three steps, it is, however, to be noted that since the third step can proceed at the same timing as and in synchronism with the first step, a substantially continuous output can be obtained if another combination of the above described thermally coupled cycles is used and operated with a timing one step displaced therefrom.

In the embodiment described with reference to and shown in FIGS. 10 and 11, a combination of the hydrogen and Ti-Mn alloys are used. However, the use of a combination of other gases and other absorbing and desorbing media is also possible.

Theoretically, it is also possible to form one cycle with MH1 and MH4 and another cycle with MH2 and MH3 and to connect them thermally, but the contemplated device will have a problem which may arise when to be started. Moreover, as is the case with any one of the foregoing embodiments, the cooling device shown in FIGS. 10 and 11, although it has been shown and described as fabricated into a two stage mode, can be fabricated into a mode having three or more stages. In any event, even in the embodiment shown in and described with reference to FIGS. 10 and 11, without the difference between the high and low pressures being increased, a lower temperature than that obtained by the single-stage cycle can be attained and, at the same time, substantially the same coefficient of performance as that exhibited by the single-stage cycle can be attained as theoretically evidenced.

Hereinafter, a model wherein two heat pump cycles for heat upgrading are combined and which can produce a higher temperature than that given by a single-stage heat pump cycle for heat upgrading will be described with reference to FIGS. 12 and 13. Even in this embodiment shown in FIGS. 12 and 13, the hydrogenated metals are employed for the medium capable of absorbing and desorbing.

Figure 12:
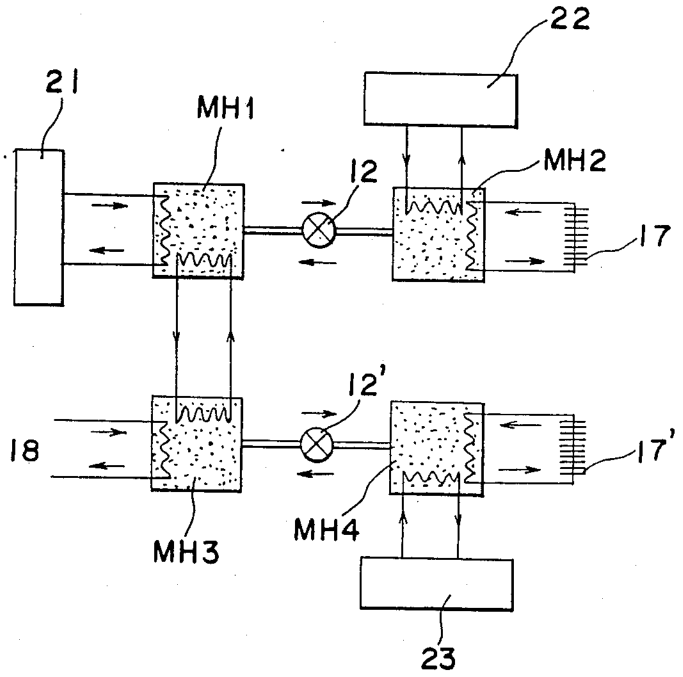
FIG. 12 is a schematic diagram showing a two-stage intermittent heat pump device for heat upgrading according to a still further embodiment of the present invention.
Figure 13:
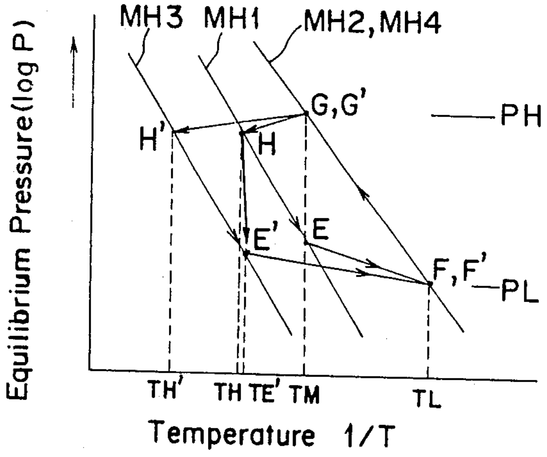
FIG. 13 is a graph showing the cycle of the device of FIG. 12.

As shown in FIGS. 12 and 13, two sets of closed vessels were prepared, each of said sets comprising two separated closed vessels and the closed vessels of the two sets being filled with respective kinds of hydrogenated metal of different temperature and equilibrium pressure characteristics. MH1 and MH2 shown in FIG. 12 form a first heat pump cycle operable on a relatively low temperature side whereas MH3 and MH4 form a second heat pump cycle operable on a relatively high temperature side. In these two heat pump cycles, the high temperature heat generating side wherein the equilibrium pressure at a given temperature is low is constituted by both MH1 and MH3.

The heat pump device of the above described structure operates in following manner. When the hydrogenated metal MH1 on the high temperature generating side of the first heat pump cycle is heated at a temperature TM by a heat source 21 and the hydrogenated metal MH2 on the low temperature heat generating side is cooled by the atmosphere air or the like of a temperature equal to or lower than the temperature TL, and when the valve 12 is subsequently opened, the hydrogen which has been absorbed in MH1 moves towards MH2. At this time, heat absorption and heat generation take place in MH1 and MH2, respectively. The heat so generated upon the hydrogen absorption is discharged to the atmosphere through a radiator 17. (The movement of the hydrogen is shown as a shift from Phase E to Phase F in FIG. 13.) When MH2 is heated by a heat source 22 of a temperature TM after the valve 12 has been closed and the heating of MH1 by the heat source 21 has been interrupted, the equilibrium pressure raises to PH. If the valve 12 is opened at this time while the heating continues, the hydrogen gas moves to MH1 and heat absorption takes place in MH2 and heat of a temperature TH is generated in MH1 as a result of hydrogen absorption taking place therein. In this case, TH is higher than TM.

If the same material as in MH2 is employed in MH4, and when the valve 12′ disposed in the piping communicating between MH3 and MH4 is opened and the heat generated in MH1 is transported through the heat transportation means 13 to MH3 to heat the latter, the hydrogen in MH3 moves towards MH4. In order to achieve this reaction, the equilibrium temperature TE′ (the temperature at the point E′) of MH3 which corresponds to the equilibrium pressure PL determined by MH4 and TL must be lower than TH. The bold arrow-headed line in FIG. 13 represents the transportation of the heat.

When the hydrogen moves from MH3 to MH4 in the manner as hereinabove described, heat absorption and heat generation take place in MH3 and MH4, respectively. The heat produced upon the hydrogen absorption occurring in MH4 is discharged through a radiator 17′ to the atmosphere. When the valve 12′ is then closed and MH4 is heated by the heat source 23 of a temperature TM, the pressure increases to PH. The subsequent opening of the valve 12′ results in the hydrogen being absorbed in MH3 generating heat of a temperature TH′. By drawing the resultant heat through a heat transportation means 18, the temperature TH′ higher than the temperature TM of the heat source can be obtained, the difference TH′−TM being approximately twice that given by the single-stage cycle (TH−TM).

The inventors of the present invention have constructed and tested the structure shown in FIG. 12 having such temperature and pressure cycles as shown in FIG. 13, the result of which will now be described.

10 Kg of $Ti_{0.35}Zr_{0.65}Mn_{1.2}Cr_{0.6}Co_{0.2}$ for MH1, 10 Kg of $Ti_{0.6}Zr_{0.4}Mn_{1.4}Cr_{0.4}Cu_{0.2}$ for each of MH2 and MH4 and 10 Kg of $Ti_{0.33}Zr_{0.67}Mr_{1.4}Cr_{0.4}Cu_{0.2}$ for MH3 were filled in the device of the structure shown in FIG. 12. They were adjusted to form hydrogenated metals so that about 63 moles of hydrogen gas can cyclically move in each of the first and second heat pump cycles.

When the temperature of each of the heat sources 21, 22 and 23 and the temperature of heat discharged by the atmosphere were selected to be 72° C. and 30° C., respectively, the output temperature given by a second class heat pump of the first stage was 114° C. In addition, the output temperature TH′ given by the second heat pump cycle heated by this heat source was 150° C. The coefficient of performance which is represented by the output heat energy divided by the input was 0.18.

Even in this embodiment, the use of the same materials or materials having substantially identical temperature and equilibrium characteristics is preferred as a reaction medium on the heat absorbing side having a high equilibrium pressure at a given temperature. In addition, by the same principle, it can be contemplated to fabricate the device into a multi-stage model.

The multi-stage fabrication of the heat pump for heat upgrading according to the present invention is advantageous in that, as is the case with all of the foregoing embodiments, the difference between the high and low pressures will not increase with the increased number of the stages. In this case, the coefficient of performance can be theoretically calculated from the following equation in which the same symbols as used in the equation (4) are employed:

$$COP2T = \frac{COP1T1 \times COP1T2}{COP1T1 + COP1T2 - COP1T1 \times COP1T2} \quad (7)$$

Considering that the coefficient of performance of each cycle of the heat pump for heat upgrading is smaller than 0.5, and when the denominators in the equations (4) and (7) are compared with each other, it will readily be seen that the denominator in the equation (7) is always greater than that in the equation (4). Thus, it has now become apparent that, in the system according to the present invention, the difference between the high and low pressures does not increase with the increase of the number of the stages and will not, therefore, result in the reduction of the coefficient of performance of the combined cycles being higher than the conventional counterpart.

In the heat pump device for heat upgrading, the range of temperature over which the temperature can be raised depends on the temperature of both the heat source and the heat sink. If a relatively large temperature range is desired to be created with a single-stage cycle, a problem will arise with the increased difference between the high and low pressure as is the case where, when a low temperature is desired to be attained by the single-stage cooling, the cycle is designed by increasing the heat source temperature. In such case, the multi-effect, multi-stage heat pump device according to the present invention is useful.

Figure 14:
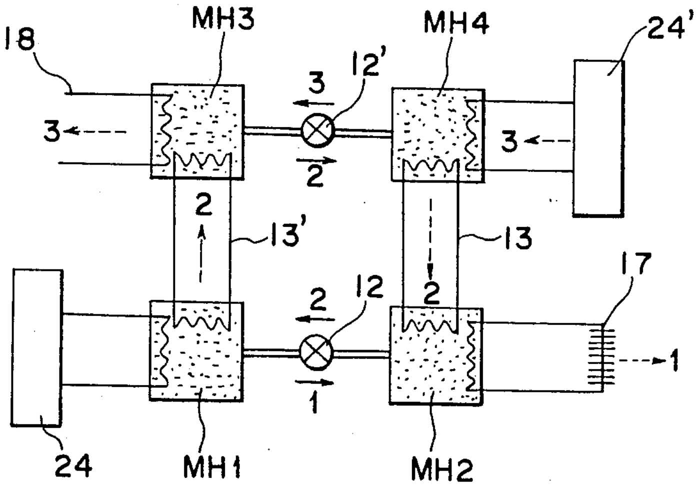
FIG. 14 is a schematic diagram showing a double-effect, two-stage intermittent heat pump for heat upgrading according to a yet further embodiment of the present invention.
Figure 15:
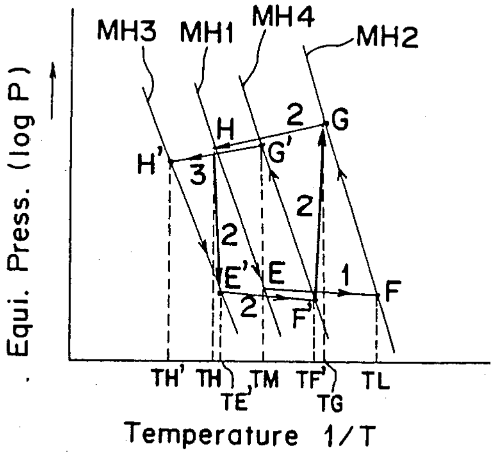
FIG. 15 is a graph showing the cycle of the device of FIG. 14.

An example of the double-effect heat pump device for heat upgrading and the cycle thereof are shown in FIGS. 14 and 15, reference to which will now be made. Even in this embodiment, the hydrogenated metal is used as a medium capable of absorbing and desorbing.

As shown in FIG. 14, two sets of closed vessels were prepared, each of said sets comprising two separated closed vessels and the closed vessels of the two sets being filled with respective kinds of hydrogenated metals of different temperature and equilibrium pressure characteristics. MH1 and MH2 shown in FIG. 14 form a first heat pump cycle operable on a relatively low temperature side whereas MH3 and MH4 form a second heat pump cycle operable on a relatively high temperature side. In these two heat pump cycles, the high temperature heat generating side wherein the equilibrium pressure at a given temperature is low is constituted by both MH1 and MH3.

First Step

When the hydrogenated metal MH1 on the high temperature heating side of the first heat pump cycle is heated by a heat source 24 at a temperature TH while the hydrogenated metal MH2 on the low temperature heat generating side is cooled by the atmosphere air through a radiator 17 to a value equal to or lower than TL, and when the valve 12 is subsequently opened, the hydrogen absorbed in MH1 moves towards MH2. It is to be noted that the arrow-headed solid lines and the arrow-headed broken lines both used in FIG. 14 represent the movement of the hydrogen and the transportation of the heat and the numerical characters 1, 2 and 3 affixed to these arrow-headed lines represent the first, second and third steps.

In this first step, since MH1 is supplied with heat from the heat source 24 and MH2 consequently generates heat, the heat so generated is removed through the radiator 17.

Second Step

When the valve 12 is closed and the heat is transported from MH1 towards MH3 through the transportation means 13 after the termination of the first step, and when the valve 12 once closed is subsequently opened again, the hydrogen moves from MH2 towards MH1 at which heat is generated. This heat so generated is used to heat MH3, accompanied by the evolution of the hydrogen. When the valve 12' is then opened, the hydrogen so evolved is absorbed in MH4 to generate heat which is in turn transported through the transportation means 13 to MH2 with the result of enhancing the generation of the hydrogen in MH2. This in turn results in the increased generation of the heat which is used to heat MH3. In this way, the process cyclically takes place and, as a result, the hydrogen moves from MH2 to MH1 and from MH3 to MH4. Upon the termination of the reaction, the valves 12 and 12' are closed.

Third Step

When MH4 is heated by a heat source 24' and the valve 12' is subsequently opened, the hydrogen moves from MH4 to MH3 at which heat is absorbed and MH3, therefore, generates heat which can be drawn from an output end 18.

Referring to the cycle chart of FIG. 15, the temperature at which MH1 is heated, the temperature of the heat generated and the temperature at which MH3 is heated are TM, TH and TE', respectively, and since TE' is selected to be lower than TH, it is possible to transport the heat from MH1 to MH3. In addition, the heating temperature of MH4 and the temperature of the heat discharged are TM and TF', respectively, and since the heating temperature TG of MH2 is selected to be lower than TF', it is possible to transport the heat from MH4 to MH2. By combining in this way, it is possible to cause MH3 to produce the heat at a temperature TH. It is to be noted that in FIG. 15 the bold arrow-heated lines represent the transportation of the heat and numerical characters 1, 2 and 3 used therein represent the first, second and third steps, respectively.

The inventors of the present invention have constructed and tested the cooling device of the structure shown in FIG. 14 and having temperature and pressure cycles shown in FIG. 15, the result of which will now be described.

5 Kg of $Ti_{0.33}Zr_{0.67}Mn_{1.4}Cr_{0.4}Cu_{0.2}$ for MH1, 5 Kg of $Ti_{0.6}Zr_{0.4}Mn_{1.4}Cr_{0.4}Cu_{0.2}$ for MH2, 5 Kg of $Ti_{0.3}Zr_{0.7}Mn_{1.2}Cr_{0.6}Cu_{0.2}$ for MH3, and 5 kg of $Ti_{0.35}Zr_{0.65}Mn_{1.2}Cr_{0.6}Co_{0.2}$ were filled in the device of the structure shown in FIG. 14. They were adjusted to form hydrogenated metals so that about 31 moles of hydrogen can move in each of the heat pump cycles.

When the temperature of the heat source and the temperature of the heat discharged were set to be 100° C. and 20° C., respectively, the temperature of heat produced in the first cycle and the required heating temperature on the low temperature side are 146° C. and 60° C., respectively.

On the contrary thereto, the heating temperature on the high temperature side of the second cycle and the temperature of heat generated on the low temperature side are 140° C. and 66° C., respectively, and the heat generated in the first cycle and the waste heat in the second cycle were used to drive the second cycle and the low temperature side of the first cycle, respectively. The result was that a temperature of 173° C. could be obtained on the high temperature side of the second cycle.

The high pressure in each of the two cycles was lower than 5 atms. while the low pressure in each of these cycles was higher than 1 atm.

The coefficient of performance of the double-effect, two-stage cooling cycle was 0.3 and substantially the same as that given by the second class heat pump of the first stage.

Although the description of the principle of operation described hereinabove has been classified into three steps, it is, however, to be noted that since the third step can proceed at the same timing as and in synchronism with the first step, the substantially continuous output can be obtained if another combination of the above described thermally coupled cycles is used and operated at a timing one step displaced therefrom.

The device shown in and described with reference to FIGS. 14 and 15, although it is a two-stage model, can be modified into a multi-stage model by using the same principle where the heat source temperature is high. In addition, as is the case with any one of the foregoing embodiments, a higher temperature than that given by the single-stage model can be obtained with the difference between the high and low pressures being undesirably increased. At the same time, as has been discussed, the coefficient of performance can remain substantially at a value of the single-stage model.

Although the present invention has fully been described in connection with the preferred embodiments with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A combined intermittently operated heat pump device which comprises:

- a first intermittently operated relatively high temperature heat cycle means including two absorbent materials having respective lower and higher absorption equilibrium pressures at respective higher and lower temperature sides and a working gas absorbable in said absorbent materials;
- a second intermittently operated relatively low temperature heat cycle means including two absorbent materials having respective lower and higher absorption equilibrium pressures at respective higher and lower temperature sides and a working gas absorbable in said absorbent materials;

a heat transport means connecting said first and second heat cycle means together for supplying the heat of absorption of the lower absorption equilibrium pressure absorbent material in one of the first and second heat cycle means as a source of heat of desorption to the lower absorption equilibrium pressure absorbent in the other of the first and second heat cycle means, and simultaneously supplying the heat of absorption of the higher absorption equilibrium pressure absorbent material in said other of said first and second heat cycle means as a source of heat of desorption to the higher absorption equilibrium pressure absorbent material in said one of said first and second heat cycle means; and the temperature of the heat of absorption of the lower equilibrium pressure absorbent material used on the high temperature side of said first heat cycle means being higher than the temperature of the heat of desorption of the lower equilibrium pressure absorbent material used on the high temperature side of said second heat cycle means, wherein the heat of absorption of said first heat cycle means flows to the second heat cycle means to heat the second heat cycle means, and the temperature of the heat of absorption of the higher absorption equilibrium pressure absorbent material used on the low temperature side of said second heat cycle means being higher than the temperature of the heat of desorption of the higher equilibrium pressure absorbent material used on the low temperature side of said first heat cycle means, whereby the heat of absorption of said second heat cycle means flow to said first heat cycle means to be taken up by the heat of desorption in said first heat cycle means.

2. A combined intermittently operated heat pump device which comprises:

a first heat pump cycle means including first and second vessels each containing an absorbent for a working gas, a first channel communicating the first and second vessels, and a first valve means in said first channel for selectively opening and closing said first channel;

a second heat pump cycle means including third and fourth vessels each containing an absorbent for the working gas, a second channel communicating said third and fourth vessels, and a second valve means in said second channel for selectively opening closing said second channel;

means for heat exchangeably and thermally coupling said first and third vessels and said second and fourth vessels, respectively; and a heating source coupled to said first vessel for heating said first vessel, heat radiating means coupled to said second vessel for radiating heat therefrom, a further heating source coupled to said fourth vessel for supplying heat to said fourth vessel, and heat output means coupled to said third vessel;

said absorbents being absorbents for giving said first heat pump cycle means an operating region at a low temperature relative to the operating region of said second heat pump cycle means and said second heat pump cycle means an operating region at a high temperature relative to the operating region of said first heat pump cycle means, the absorbents in said first and third vessels being lower equilibrium pressure absorbents at given temperatures than the absorbents in said second and fourth vessels and the temperature of the heat of absorption of the absorbent in said first vessel being higher than the temperature of the heat of desorption of the absorbent in said third vessel, and the temperature of the heat of desorption of the absorbent in the second vessel being lower than the temperature of the heat of absorption of the absorbent in the fourth vessel, whereby the first and third vessels operate at a relatively high temperature in each of the respective heat pump cycle means and the heat generated as a result of absorption of working gas by the absorbent in the first vessel, when the first and second heat pump cycle means are operated as a heating cycle, is used to heat the third vessel and the heat from the fourth vessel is supplied to the second vessel for desorption, the heat from the third vessel being caused to flow into a heating load.

* * * * *